(12) United States Patent
Nestorovic et al.

(10) Patent No.: US 10,114,215 B1
(45) Date of Patent: Oct. 30, 2018

(54) SCANNING LASER DEVICES WITH REDUCED EXIT PUPIL DISPARITY

(71) Applicant: Microvision, Inc., Redmond, WA (US)

(72) Inventors: Nenad Nestorovic, Seattle, WA (US); Roeland Collet, Olympia, WA (US)

(73) Assignee: Microvision, Inc., Redmond, WA (US)

( * ) Notice: Subject to any disclaimer, the term of this patent is extended or adjusted under 35 U.S.C. 154(b) by 0 days.

(21) Appl. No.: 15/489,251

(22) Filed: Apr. 17, 2017

(51) Int. Cl.
| | | |
|---|---|---|
| *G02B 26/08* | (2006.01) |
| *G02B 26/10* | (2006.01) |
| *G02B 27/00* | (2006.01) |
| *G02B 27/01* | (2006.01) |
| *H04N 3/08* | (2006.01) |
| *G02B 17/02* | (2006.01) |

(52) U.S. Cl.
CPC ......... *G02B 26/105* (2013.01); *G02B 17/023* (2013.01); *G02B 26/101* (2013.01); *G02B 27/0081* (2013.01); *G02B 27/0101* (2013.01); *H04N 3/08* (2013.01)

(58) Field of Classification Search
CPC .. G02B 26/105; G02B 17/023; G02B 26/101; G02B 27/0081; G02B 27/0101; G02B 27/0172; H04N 3/08

USPC ....................................................... 359/201.2
See application file for complete search history.

(56) References Cited

U.S. PATENT DOCUMENTS

| | | | | |
|---|---|---|---|---|
| 8,270,087 | B2 * | 9/2012 | Oka .................... | G02B 27/0172 359/619 |
| 2003/0179349 | A1 * | 9/2003 | Fukunaga .............. | G03B 21/28 353/99 |
| 2008/0259425 | A1 * | 10/2008 | Boettcher .......... | B23K 26/0643 359/201.1 |

* cited by examiner

*Primary Examiner* — Euncha Cherry
(74) *Attorney, Agent, or Firm* — Kevin D. Wills (57) ABSTRACT

The embodiments described herein provide scanning laser devices that include a relay optic between scanning surfaces. In general, the relay optic is configured to reimage the laser beam reflecting from a first scanner onto the second scanner. Specifically, the relay optic is configured to reimage a laser beam reflected from over an angular range from a first scanning surface of a first scanner onto the scanning surface of the second scanner. This can effectively make the exit pupil of the scanners substantially coincident, and thus can reduce the exit pupil disparity between the scanners that would otherwise exist.

19 Claims, 6 Drawing Sheets

SCANNING LASER DEVICES WITH REDUCED EXIT PUPIL DISPARITY

FIELD

The present disclosure generally relates to scanning laser devices, and more particularly relates to scanning laser devices that use at least two scanners.

BACKGROUND

In scanning laser devices, laser light is reflected off one or more scanning mirrors to generate a scanning pattern. For example, in scanning laser projectors, images are projected by scanning laser light into a pattern with a scanning mirror, with individual pixels generated by modulating the laser light during the scan. Similarly, laser depth scanners generate depth maps by scanning laser light into a pattern with a scanning mirror and measuring the laser light reflected back.

Some scanning laser devices use multiple scanning mirrors to scan the laser light into a pattern. For example, some scanners use a first scanning mirror to provide for scanning in one axis of motion, while using a second scanning mirror to provides for scanning in another axis of motion.

One issue with scanning laser devices that include multiple scanning mirrors is exit pupil disparity. Specifically, the exit pupil for one scanning mirror can be spatially separated from the exit pupil of the other scanning mirror. Such a disparity can be problematic for applications that require a well-defined entrance pupil for good optical performance. Thus, there is a need for techniques that reduce exit pupil disparity in scanning laser devices that use multiple scanning mirrors.

DESCRIPTION OF EMBODIMENTS

The embodiments described herein provide scanning laser devices that include a relay optic between scanning surfaces. In general, the relay optic is configured to reimage the laser beam reflecting from a first scanner onto the second scanner. Specifically, the relay optic is configured to reimage a laser beam reflected from over an angular range from a first scanning surface of a first scanner onto the scanning surface of the second scanner. This can effectively make the exit pupil of the scanners substantially coincident, and thus can reduce the exit pupil disparity between the scanners that would otherwise exist.

The use of such a relay optic to reduce exit pupil disparity can improve the performance of scanning laser devices. For example, in scanning laser projectors, such a configuration can reduce clipping and/or vignetting that could otherwise result from an exit pupil disparity in the two scanners. Such a configuration is particularly applicable to scanning laser projectors that require a well-defined pupil, such as heads up displays (HUDs) and head mounted displays (HMDs). However, such a configuration can also be used to improve the performance of other scanning laser devices that include multiple scanners, including other scanning laser projectors and laser depth scanners. Thus, such a configuration can be used to improve the performance of a wide variety of scanning laser devices, including traditional image projectors, LIDAR systems, 3D motion sensing devices, gesture recognition devices, etc.

Figure 1:
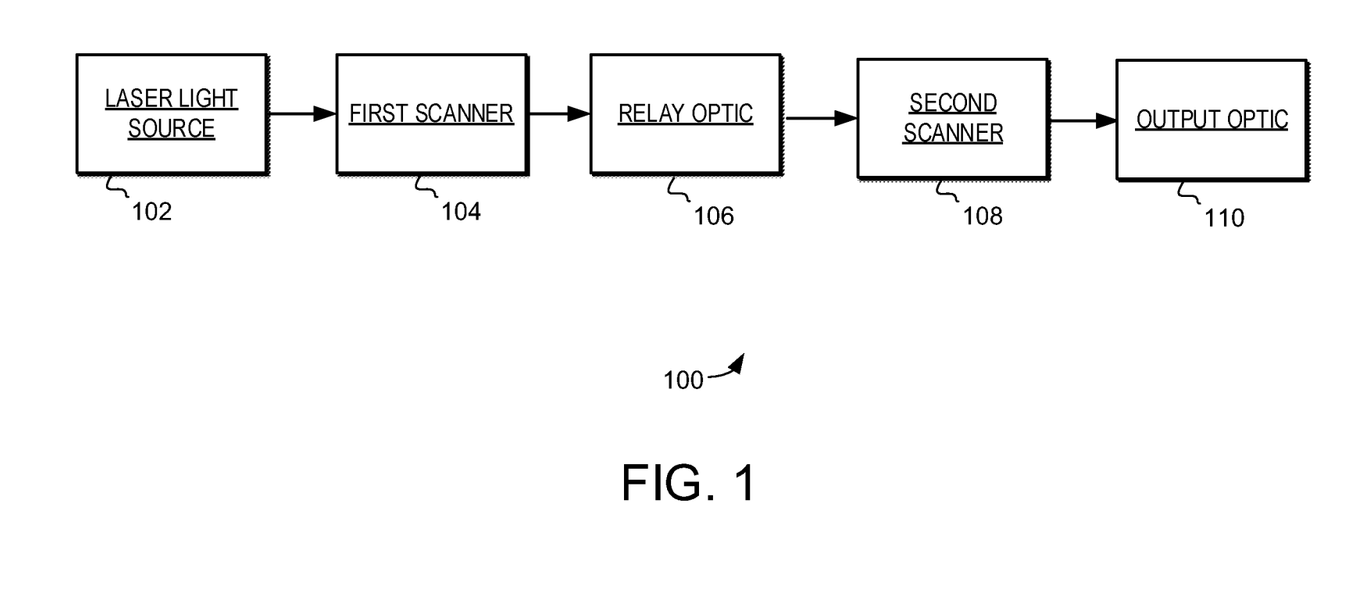
FIG. 1 shows a schematic diagram of scanning laser device in accordance with various embodiments of the present invention.

Turning now to FIG. 1, an exemplary scanning laser device 100 is illustrated schematically. The scanning laser device 100 includes a laser light source 102, a first scanner 104, a relay optic 106, a second scanner 108 and output optics 110.

The laser light source 102 can be implemented with any suitable laser(s) and to generate any suitable type of a laser light for use in the scanning laser device 100. For example, the laser light source 102 can include lasers of various colors (e.g., red, green, and blue) suitable for image projection. As other examples, laser light source 102 can include non-visible lasers, such as infrared. In a typical implementation the laser light source 102 would be driven based on the specific requirements of the scanning laser device 100. For example, in an image projection device, the laser light source 102 would typically be driven to generate a laser beam encoded with pixel data to generate image pixels. In other examples, the laser light source 102 would be driven to generate pulses used for depth mapping. Detailed examples of such devices will be discussed in greater detail with reference to FIGS. 5 and 6 below.

The laser light source 102 thus provides a beam of laser light that is projected by the scanning laser device 100. To facilitate this, the first scanner 104 and the second scanner 108 include scanning surfaces (e.g., mirrors) that controllably reflect the laser beam. Specifically, during operation of the scanning laser device 100, the motion of the scanners 104 and 108 are controlled to reflect the beam of laser light into a desired pattern.

It should be noted that when the laser beam reflects off a scanning surface (e.g., first scanner 104, second scanner 108), the angles over which the laser beam reflects define the spatial locations of the resulting scan pattern. Thus, the spatial information of the resulting scan pattern is contained as "angular information" in the reflected laser beam. Stated another way, the angular information contained within the reflected laser beam defines and determines the final spatial location each point of the scan.

In a typical implementation the first scanner 104 provides for one axis of motion (e.g., horizontal or vertical), while the second scanner 108 provides for another axis of motion (e.g., vertical or horizontal). Furthermore, in such an implementation one scanner may be operated at relatively fast scan rate, while the other scanner is operated at a relatively slow scan rate. Finally, in some embodiments one scanner can have a relatively larger scanning surface compared to the other scanner. Taken together, the two scanners 104, 108 provide the motion needed to reflect the laser beam into the scan pattern desired for a particular application.

However, the use of two scanners 104, 108 also results in two separate exit pupils at disparate locations. In general, an "exit pupil" of an optical device is the location that defines the optical image "seen" at the output of the device. Stated another way, the exit pupil defines the angle space of a projection outputted from the device. The exit pupil of a scanner (e.g., scanners 104 and 108) will thus generally be located on the reflecting surface of the scanner.

In scanning laser device 100, the two scanners 104 and 108 will have separate reflecting surfaces and thus will have separate exit pupils. Furthermore, there will be a disparity in the location of the exit pupils along the optical axis. As was noted above, such a disparity can negatively impact the performance of the scanning laser device 100. The relay optic 106 is provided to reduce this disparity in exit pupil location. Making the exit pupils of the two scanners 104, 108 coincident reduces the exit pupil disparity that would otherwise exist in the scanning laser device 100.

In accordance with the embodiments described herein, relay optic 106 is implemented between the first scanner 104 and the second scanner 108. The relay optic 106 is configured to reimage the laser beam reflecting from the first scanner 104. Specifically, the relay optic 106 is configured to reimage the reflected laser beam over an angular range from a first scanning surface of a first scanner 104 and onto the scanning surface of the second scanner 108. This reimaging of the reflected laser beam effectively refocuses the laser beam that was spread out by the first scanner 104. Thus, instead of the laser beam extending across a larger area of the second scanner 108, the laser beam is confined to one relatively small location on the second scanner 108. Thus, this reimaging of the reflected laser beam effectively makes the exit pupil of the first scanner 104 and the second scanner 108 substantially coincident.

The relay optic 106 can be implemented with a variety structures and devices. For example, in embodiment, the relay optic 106 is implemented with an afocal relay. In general, an afocal relay is an optical system that does not produce a direct spatial image, but rather converts an input angular subtense into an output angular subtense. The output angular subtense can be equivalent to the input angular subtense or can be designed to be smaller or larger than the input angular subtense. When implemented in the relay optic 106 the light entering the afocal relay is effectively from an "infinite conjugate" and has purely angular content, while the light exiting the afocal relay has purely angular content. Examples of suitable afocal relays can include telescopes, microscopes and laser beam expanders.

In one embodiment, the relay optic 106 is implemented with a first imager and a second imager. As one example implementation, the first imager is configured to focus the first angular range of the reflected laser beam and the second imager configured to convert the focused laser beam over the first angular range into an afocal space. Such a configuration forms an image plane between the first imager and the second imager. An example of such an implementation will be discussed below.

In various embodiments, the relay optic 106 can comprise refractive elements, reflective elements, or combinations of refractive and reflective elements. As one specific example, the relay optic 106 can comprise a plurality of fold mirrors. In such an embodiment the plurality of fold mirrors is configured to form an image plane between two of the plurality of fold mirrors. In one implementation that will be described in greater detail below, the relay optic 106 can comprise four fold mirrors, but in other embodiments fewer fold mirrors (e.g., 2) or more fold (e.g., 5 or more) mirrors can instead be used.

In one embodiment, the relay optic 106 can implemented to also function as a pupil expander. This embodiment can be useful in implementations where the second scanner 108 has a larger scanning surface and a resulting lower scan angle is acceptable.

In the scanning laser device 100, the second scanner 108 passes the reflected laser beam in the form of a pattern of scan lines to an output optic 110. The output optic 110 can comprise any suitable optic used to provide the output of the scanning laser device 100. As specific examples, the output optic 110 can comprise various lenses and/or mirrors used in a wide variety of devices. In all such devices, the use of the relay optic 106 can reduce exit pupil disparity and improve device performance.

As more specific examples, the output optic 110 can comprise waveguides, exit pupil expanders and/or substrate guided relays. Waveguides and substrate guided relays can be used to implement various types of scanning laser projectors, including specialized displays such as HUDs and HMDs. Notably, such waveguides and substrate guided relays are particularly sensitive to exit pupil disparities, and as such, the embodiments described herein are particularly applicable to such devices. For example, typical waveguides can require a relatively well-defined pupil to properly inject the source light into the waveguide. Thus, the relay optic 106 can facilitate the improved performance of such display devices.

Figure 2:
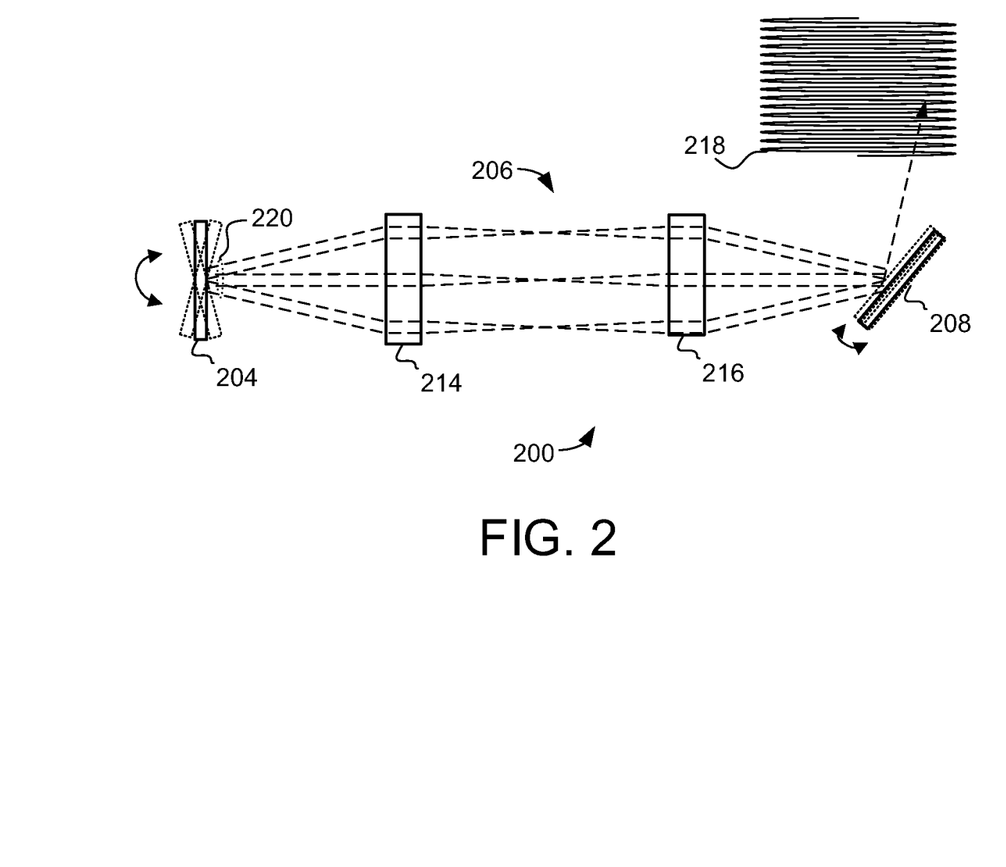
FIG. 2 shows a schematic diagram of a scanning laser device in accordance with various embodiments of the present invention.

Turning now to FIG. 2, a portion of exemplary scanning laser device 200 is illustrated schematically. The scanning laser device 200 includes a first scanner 204, a relay optic 206, and a second scanner 208. It should be noted that in this illustrated example, input optics, output optics, and other details are omitted for simplicity.

The first scanner 204 and the second scanner 208 again each include scanning surfaces that controllably reflect the laser beam. Specifically, during operation of the scanning laser device 200, the motion of the scanners 204 and 208 are controlled to reflect the beam of laser light into a desired pattern 218. And again, in a typical implementation the first scanner 204 can provide for one axis of motion (e.g., horizontal), while the second scanner 208 provides for another axis of motion (e.g., vertical). Stated another way, the motions of the scanners 204 and 208 are controlled to reflect the laser beam over a corresponding angular range, commonly referred to as a scan cone. In the example of FIG. 2, the scan cone of the first scanner 204 is identified as the angular range 220. In the illustrated example, the first scanner 204 has an axis of rotation in and out of the page, providing motion in a direction up and down on the page, while the second scanner 208 has an axis of rotation in the same plane as the page, providing motion in and out of the page.

It should again be noted that when the laser beam reflects off the scanning surfaces of the scanners 204 and 208, the angles over which the laser beam reflects define the spatial locations of the resulting scan pattern. Thus, the laser beam reflecting of the scanning surfaces contains angular information generated by the scanners that defines the spatial locations each point of the resulting scan pattern. Specifically, the laser beam reflecting off the scanning surface of the first scanner 204 includes first angular information generated by the first scanner 204. Likewise, the laser beam reflecting off the second scanner 208 includes both the first angular information created by the motion of the first scanner 204 and second angular information created by motion of the second scanner 208.

In accordance with the embodiments described herein, the relay optic 206 is implemented between the first scanner 204 and the second scanner 208. Again, the relay optic 206 is configured to reimage the reflected laser beam from a first scanning surface of the first scanner 204 and on or near the scanning surface of the second scanner 208. The second scanner 208 then expands this view in the other scan cone axis to create a full field view which appears to come from a single exit pupil located on the surface of the second scanner 208.

Again, when the laser beam exits the first scanner 204, the spatial information contained in that laser is in the form of angular information, That is, the spatial information is in an "angle space", where each different pixel or pulse corresponds to one specific angle. However, when that laser beam hits a surface (such as the scanning surface of a typical second scanner) a line is formed, and thus the information on that surface would normally be converted to a positional space. However, in these embodiments, the addition of the relay optic 206 changes the information back to an angle space before the laser beam hits the second scanner 208. Stated another way, the relay optic 206 reimages the angular information from the first scanner to a defined point before the laser beam hits the second scanner 208, while preserving all the angular information contained in the laser beam. Thus, all of the spatial information contained in the laser beam is again angular information in the form of the angles of the laser beam when it strikes the second scanner 208, and the surface of the second scanner 208 effectively becomes an exit pupil for the first scanner 204.

In this illustrated embodiment, the relay optic 206 is implemented with a first imager 214 and a second imager 216. It should be noted that in this illustrated embodiment the first imager 214 and the second imager 216 are illustrated as schematic blocks, and do not show any of the specialized optical features (e.g., shapes of surfaces, air spaces or materials) that would be provided to implement such imagers. The first imager 214 and the second imager 216 are configured to reimage the reflected laser beam over the angular range 220 reflected by the first scanner 204. Thus, the first imager 214 and the second imager 216 reimage the laser beam over the angular range 220 from the scanning surface of the first scanner 204 and onto the scanning surface of the second scanner 208. This preserves all the spatial information contained in the laser beam in the angles of the laser beam (e.g., as angular information in angle space) when it strikes the second scanner 208, and thus effectively moves the exit pupil of the first scanner 204 to the scanning surface of the second scanner 208. This makes the exit pupils of the two scanners 204, 208 substantially coincident, and thus such a reimaging can reduce or eliminate the exit pupil disparity that would otherwise exist in the scanning laser device 200. Stated another way, the relay optic 206 puts the scanning surfaces of the two scanners 204 and 208 in conjugate planes, and this reduces or eliminates exit pupil disparity between scanners 204 and 208.

Figure 3:
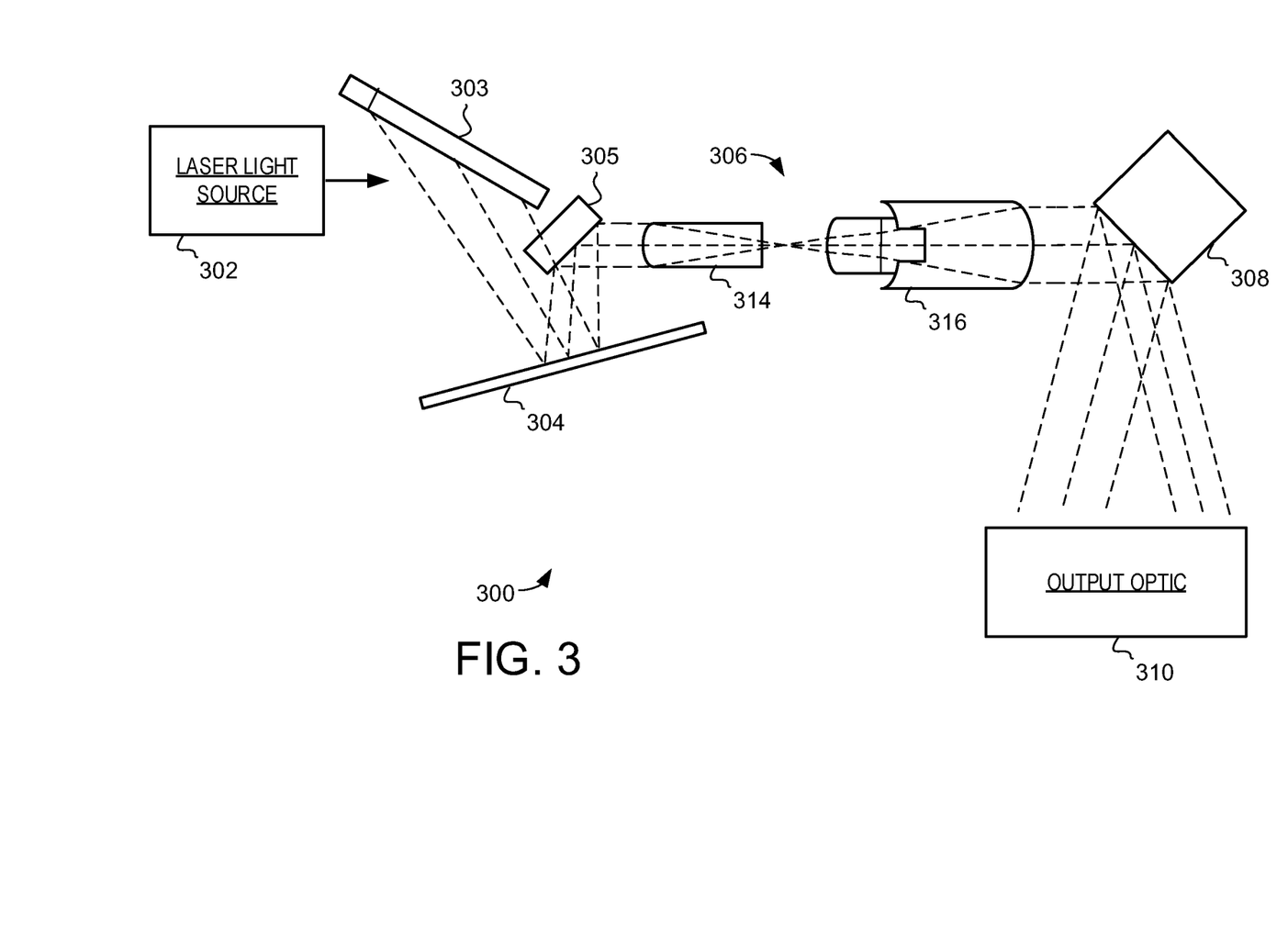
FIG. 3 shows a schematic diagram of a scanning laser device in accordance with an embodiments of the present invention.

Turning now to FIG. 3, another exemplary scanning laser device 300 is illustrated schematically. The scanning laser device 300 includes a laser light source 302, a first mirror 303, a first scanner 304, a second mirror 305, a relay optic 306, a second scanner 308 and output optics 310. Again, the laser light source 302 provides a beam of laser light that is projected by the scanning laser projector 300. The beam of laser light is directed to the first mirror 303. In this embodiment, the first mirror 303 comprises a fold mirror that that reflects the laser beam to the first scanner 304. The second mirror 305 comprises a second fold mirror that redirects the light from the first scanner 304 to the input of the relay optics 306.

Again, the first scanner 304 and the second scanner 308 each include scanning surfaces (e.g., mirrors) that controllably reflect the laser beam. Specifically, during operation of the scanning laser projector 300, the motion of the scanners 304 and 308 are controlled to reflect the beam of laser light into a desired pattern. And again, in a typical implementation the first scanner 304 can provide for one axis of motion (e.g., horizontal), while the second scanner 308 provides for another axis of motion (e.g., vertical). In the illustrated example, the first scanner 304 would provide this axis of motion in a direction in and out of the page, while the second scanner 308 would provide an axis of motion to the left and right across the page.

In accordance with the embodiments described herein, the relay optic 306 is implemented between the first scanner 304 and the second scanner 308. In general, the relay optic 306 is again configured to reimage the reflected laser beam over an angular range from a first scanning surface of the first scanner 304 and onto the scanning surface of the second scanner 308. This reimaging of the of the reflected laser beam can effectively make the exit pupil of the first scanner 304 and the second scanner 308 substantially coincident, and thus can the exit pupil disparity that would otherwise exist in the scanning laser device 300. It should be noted that in the example of FIG. 3 the angular range of the laser beam generated by the first scanner 304 would extend out of the page, and thus is not specifically illustrated in FIG. 3.

In this illustrated embodiment, the relay optic 306 is implemented with a first imager 314 and a second imager 316. Furthermore, in this illustrated embodiment the first imager 314 and the second imager 316 are both implemented with refractive optical elements. Specifically, the first imager 314 and the second imager 316 can each be implemented with one or more lenses. Furthermore, in some embodiments the first imager 314 and the second imager 316 can be implemented with lenses made of singlets and doublets for color correction and/or general aberration correction while still maintaining the afocal performance of the relay optic 306.

In general, the first imager 314 is configured to focus the first angular range of the reflected laser beam, while the second imager 316 is configured to convert the focused laser beam over the first angular range into an afocal space. As such, the first imager 314 and the second imager 316 together provide an afocal relay, with little or no net convergence or divergence at the output of the relay optic 306. Furthermore, it should be noted that such a configuration forms an image plane between the first imager 314 and the second imager 316. In the illustration of FIG. 3, this image plane is generated where the major rays intersect between the first imager 314 and the second imager 316.

It should be noted that while the relay optic 306 in this embodiment comprises two refractive elements (e.g., the first imager 314 and the second imager 316) that such a device can also include different combinations and numbers of elements. For example, the relay optic 306 can include additional refractive and/or reflective elements to implement the afocal relay and reimage the exit pupil of the first scanner 304 onto the scanning surface of the second scanner 308.

Figure 4:
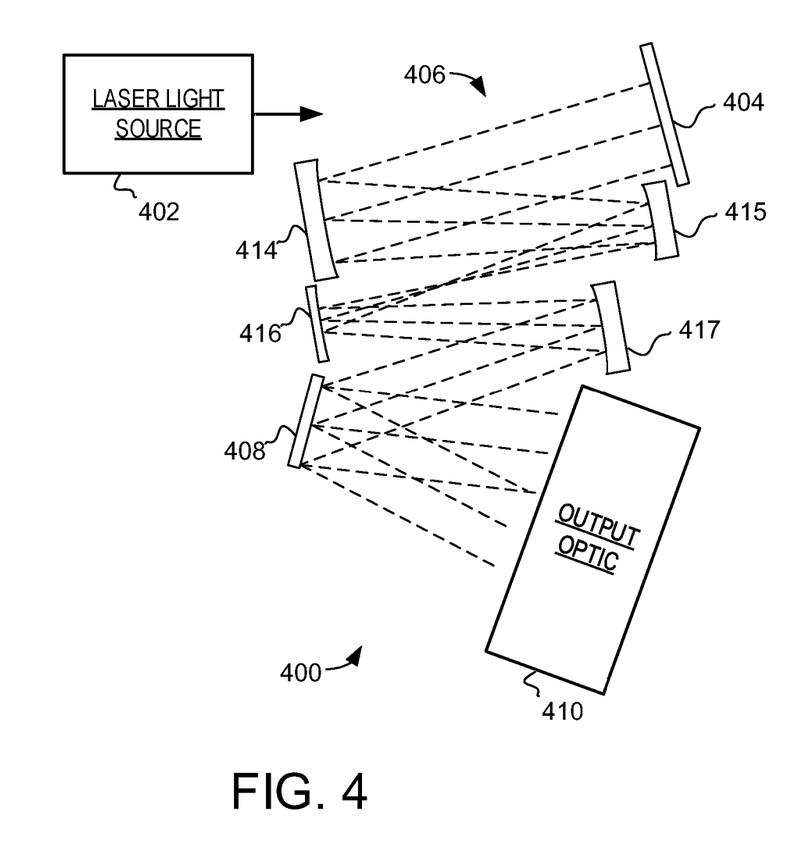
FIG. 4 shows a schematic diagram of a scanning laser device in accordance with another embodiments of the present invention.

Turning now to FIG. 4, another exemplary scanning laser device 400 is illustrated schematically. Similar to the previous embodiments, the scanning laser device 400 includes a laser light source 402, a first scanner 404, a relay optic 406, a second scanner 408 and output optics 410.

Again, the laser light source 402 provides a beam of laser light that is directed to the first scanner 404. And again, the first scanner 404 and the second scanner 408 each include scanning surfaces that controllably reflect the laser beam. For example, the first scanner 404 can provide for one axis of motion (e.g., horizontal), while the second scanner 408 provides for another axis of motion (e.g., vertical).

In accordance with the embodiments described herein, the relay optic 406 is implemented between the first scanner 404 and the second scanner 408. In this illustrated embodiment, the relay optic 406 includes four mirrors 414, 415, 416, and 417. Similar to the embodiment of FIG. 3, these four mirrors 414, 415, 416, and 417 are configured to implement a first imager and a second imager. Specifically, mirrors 414 and 415 implement a first imager and mirrors 416 and 417 implement a second imager. Like the embodiment of FIG. 3, the first imager is configured to focus the first angular range of the reflected laser beam, while the second imager is configured to convert the focused laser beam over the first angular range into an afocal space. As such, the four mirrors 414, 415, 416, and 417 together provide an afocal relay, with little or no net convergence or divergence at the output of the relay optic 406.

Furthermore, it should be noted that such a configuration forms an image plane between the mirrors 414 and 415 and the mirrors 416 and 417. In the illustration of FIG. 4, this image plane is generated where the major rays intersect between the mirror 415 and the mirror 416.

In this illustrated embodiment, the four mirrors 414, 415, 416, and 417 are shaped and configured to provide the first and second imagers and thus provide reimaging of the laser beam at the surface of the first scanner 404. For example, the four mirrors 414, 415, 416, and 417 can each include shaped aspheric surfaces or anamorphic surfaces configured to provide good aberration correction while maintaining the afocal requirements of the relay optic 406. One potential advantage to such an embodiment is that the four mirrors 414, 415, 416, and 417 can also be implemented to provide color correction.

Finally, it should be noted that while the relay optic 406 in this embodiment comprises four mirrors, that such a device could also include different combinations and numbers of elements. For example, the relay optic 406 can include fewer reflective elements. In other variations, the relay optic 406 can comprise additional refractive and/or reflective elements to implement the afocal relay and reimage the exit pupil of the first scanner 404 onto the scanning surface of the second scanner 408.

Figure 5:
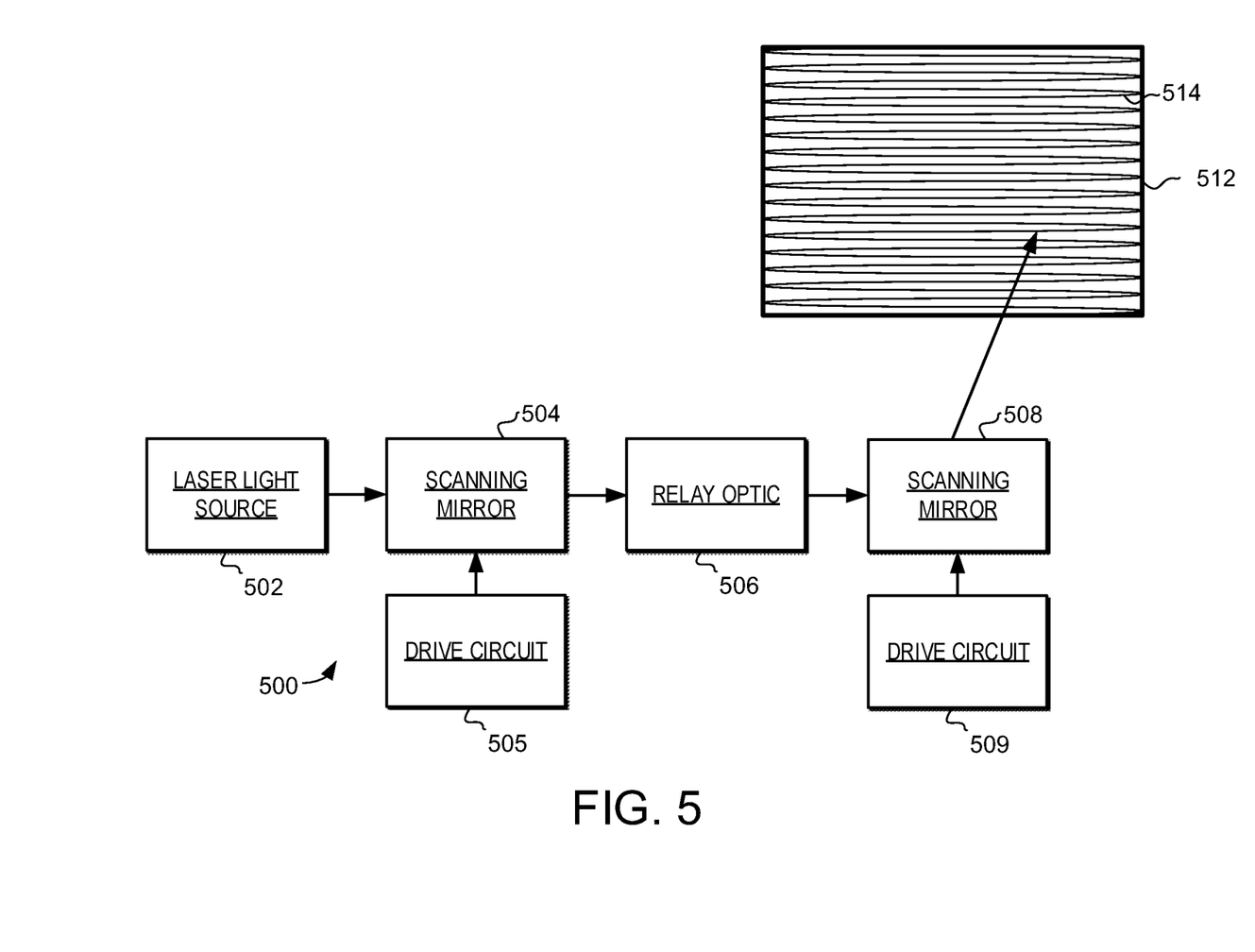
FIG. 5 shows a schematic view of a scanning laser device in accordance with various embodiments of the present invention.

Turning now to FIG. 5, a schematic diagram of a scanning laser device 500 is illustrated. The scanning laser device 500 includes a laser light source 502, first scanning mirror 504 and first drive circuit 505, a relay optic 506, and second scanning mirror 508 and second drive circuit 509. During operation, the laser light source 502 generates at least one beam of laser light that is reflected by the scanning mirror 504 and 508 into a pattern 514 of scan lines inside a scanning region 512. In the example of FIG. 5, the pattern 514 of scan lines comprises a raster pattern. However, this is just one example, and in other embodiments, other patterns of scan lines can be generated as used. For example, spiral patterns and Lissajous patterns could instead be implemented.

To facilitate this, the first drive circuit 505 and the second drive circuit 509 control the movements of their corresponding scanning mirrors 504 and 508. Specifically, the drive circuits 505 and 509 provide excitation signals to excite motion of the scanning mirrors 504 and 508.

Such a scanning laser device 500 can be implemented to perform a variety of functions. For example, the scanning laser device 500 can be implemented to facilitate image projection, laser depth scanning, LIDAR, 3D motion sensing, gesture recognition, etc.

As one example, in a device implemented to provide image projection, the beam of laser light would be encoded with pixel data to generate image pixels. In another example, the laser light source 502 can include an infrared or other suitable laser that is used to generate the depth mapping pulses. Reflections of these pulses from a surface can then be received and used to generate 3-dimensional maps of the surface.

For example, the depth map of the surface can be determined by calculating a time of flight for the return of each received depth mapping pulse.

In accordance with the embodiments described herein, the relay optic 506 is implemented between the first scanning mirror 504 and the second scanning mirror 508. The relay optic 506 is configured to reimage the laser beam reflecting from the first scanning mirror 504. Specifically, the relay optic 506 is configured to reimage the reflected laser beam over an angular range from the first scanning mirror 504 and onto the second scanning mirror 508. This reimaging of the of the reflected laser beam can effectively make the exit pupil of the first scanning mirror 504 and the second scanning mirror 508 substantially coincident. Making the exit pupils of the two mirrors coincident reduces the exit pupil disparity that would otherwise exist in the scanning laser device 500.

The relay optic 506 can be implemented with a variety structures and devices. For example, using the various combinations of refractive and reflective elements described above with reference to FIGS. 2, 3 and 4. As specific examples, the relay optic 506 can implement an afocal relay with little or no net convergence or divergence.

Figure 6:
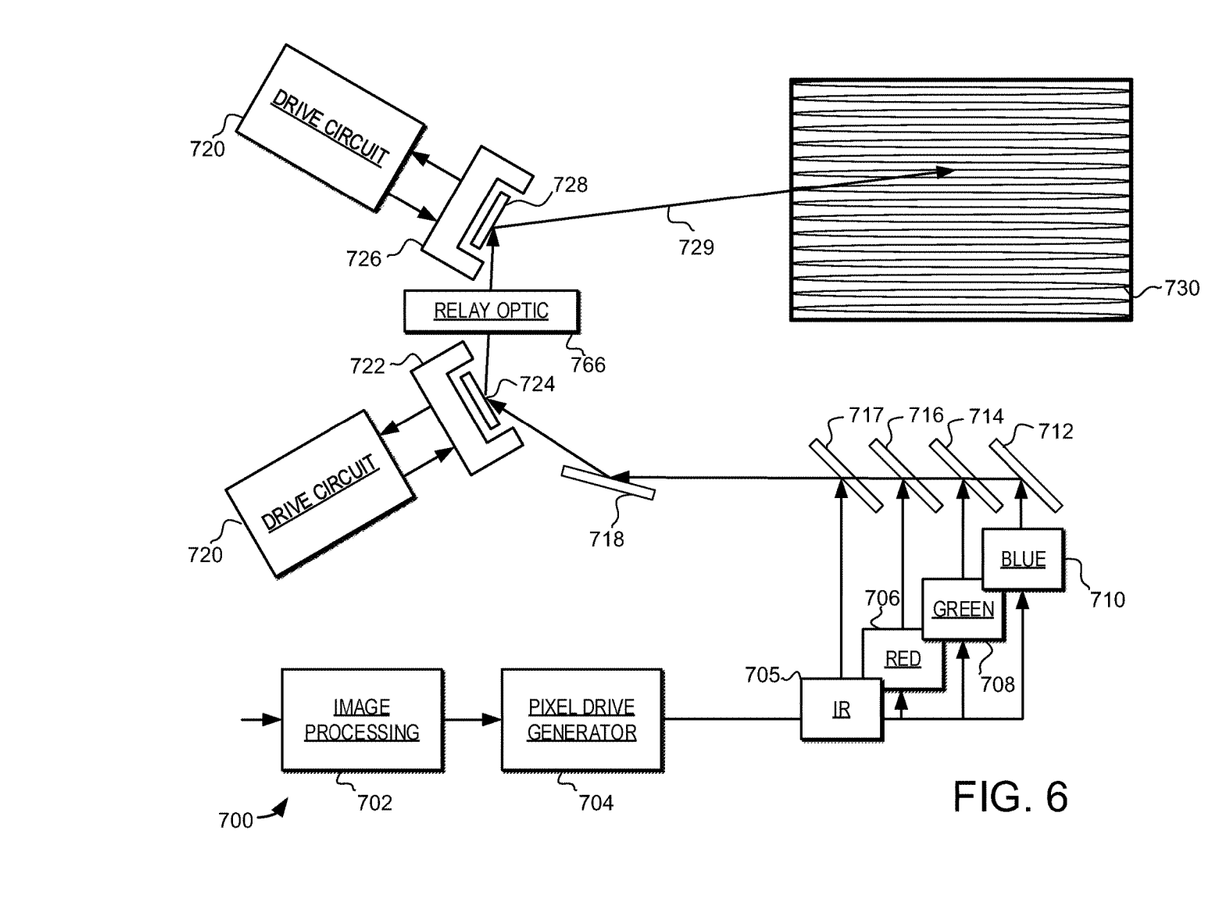
FIG. 6 shows a schematic view of a scanning laser projector in accordance with various embodiments of the present invention.

Turning now to FIG. 6, a schematic view of a scanning laser projector 700 is illustrated. The scanning laser projector 700 is a more detailed example of the type of system that can be used in accordance with various embodiments of the present invention. Specifically, the scanning laser projector 700 can be implemented using the various scanners described above. In some embodiments, the scanning laser projector is implemented to provide both laser depth scanning and laser image projection, while in other embodiments, only image projection is provided.

Scanning laser projector 700 includes an image processing component 702, a pixel drive generator 704, an infrared laser module 705, a red laser module 706, a green laser module 708, and a blue laser module 710. In such an embodiment, the red, green and blue light can be used for image projection, while the infrared light can be used for depth scanning. Light from the laser modules is combined with dichroics 712, 714, 716, and 717. Scanning laser projector 700 also includes fold mirror 718, drive circuits 720, a first scanner assembly 722 with first scanning mirror 724, and second scanner assembly 726 with a second scanning mirror 728. It should be noted that this illustrated arrangement for combing the outputs from the various laser modules is just one example implementation, and other implementations using different techniques for combing laser light of different wavelengths can instead be used.

In operation, image processing component 702 processes video content using two dimensional interpolation algorithms to determine the appropriate spatial image content for each scan position at which an output pixel is to be displayed by the pixel drive generator 704. For example, the video content may represent a grid of pixels at any resolution (e.g., 640×480, 848×480, 1280×720, and 1920×1080). The input light intensity encoding typically represents the light intensity in 8, 10, 12 bit or higher resolutions.

This content is then mapped to a commanded current for each of the red, green, and blue laser sources such that the output intensity from the lasers is consistent with the input image content. In some embodiments, this process occurs at output pixel rates in excess of 150 MHz. The laser beams are then directed onto scanning mirrors 724 and 728. In general, the first scanning mirror 724 provides for one axis of motion (e.g., horizontal), while the second scanning mirror 728 provides for another axis of motion (e.g., vertical). In a typical implementation of such an embodiment, the second scanning mirror 728 is operated to provide the vertical scanning motion at a relatively slow scan rate, while the first scanning mirror 724 is operated to provide horizontal motion at a relatively fast scan rate. This results in the output beam 729 generating a scanning pattern 730.

To provide such a system, the rotation of the second scanning mirror 728 can be operated quasi-statically to create a vertical sawtooth raster trajectory. Conversely, the rotation of the first scanning mirror 724 can be operated on a resonant vibrational mode of the scanning mirror 724 to create sinusoidal motion. Together, this generates both horizontal and vertical motion of the laser beam and results in the pattern 514 of scan lines.

In these embodiments, output beam 729 sweeps back and forth left-to-right in a sinusoidal pattern, and sweeps vertically (top-to-bottom) in a sawtooth pattern with the display blanked during flyback (bottom-to-top). It should be noted that the illustrated scanning pattern 730 shows a sinusoidal pattern as the beam sweeps vertically top-to-bottom, but does not show the flyback from bottom-to-top.

In other embodiments, the vertical sweep is controlled with a triangular wave such that there is no flyback. In still further embodiments, the vertical sweep is sinusoidal. Finally, the various embodiments of the invention are not limited by the waveforms used to control the vertical and horizontal sweep or the resulting raster pattern 730.

It should be noted that in some embodiments, the first scanner assembly 722 and the second scanner assembly 726 both use electromagnetic actuation. However, in other embodiments one more of the scanner assemblies can use other techniques, including electrostatic or piezoelectric actuation. Furthermore, any number of mirrors and type of mirror actuation may be employed without departing from the scope of the present invention.

The drive circuits 720 provide drive signals to scanner assemblies 722 and 726. The drive signals include excitation signals to control the motion of the scanning mirrors 724 and 728. In operation, the laser light sources produce light pulses for each output pixel and scanning mirrors 724 and 728 reflect the light pulses as the output beam 729 traverses the pattern 730. Drive circuits 720 can also receive feedback signals from scanner assemblies 722 and 726. The feedback signals can describe the driven deflection angles of the mirrors, and can be used by the drive circuits 720 to more accurately control the motion of the scanning mirrors 724 and 728.

For example, the drive circuits 720 can excite resonant motion of scanning mirrors 724 and/or 728 such that the peak amplitude of the feedback signal is constant. This provides for a stable maximum angular deflection on the fast-scan axis as shown in raster pattern 730. The excitation signal used to excite resonant motion of scanning mirrors 724 and 728 can include both amplitude and a phase. Drive circuits 720 can include feedback circuits that modify the excitation signal amplitude to keep the feedback signal peak amplitude substantially constant. Additionally, the drive circuits 720 can modify the excitation signal to control the horizontal phase alignment and vertical position of the raster pattern 730.

To facilitate this, drive circuits 720 may be implemented in hardware, a programmable processor, or in any combination. For example, in some embodiments, drive circuit 720 is implemented in an application specific integrated circuit (ASIC). Further, in some embodiments, some of the faster data path control is performed in an ASIC and overall control is provided by a software programmable microprocessor.

It should be noted that while FIG. 6 illustrates an embodiment with red, green, blue, and infrared laser light sources, the various embodiments are not limited to these exemplary wavelengths of laser light.

Finally, In accordance with the embodiments described herein, relay optic 766 is implemented between the first scanning mirror 724 and the second scanning mirror 728. The relay optic 766 is again configured to reimage the laser beam reflecting from the first scanning mirror 724 onto the second scanning mirror 728. This reimaging of the of the reflected laser beam can effectively make the exit pupil of the first scanning mirror 724 and the second scanning mirror 728 substantially coincident. Making the exit pupils of the two mirrors coincident reduces the exit pupil disparity that would otherwise exist in the scanning laser projector 700.

In one embodiment, a scanning laser device is provided, comprising: at least one source of laser light, the at least one source of laser light configured to generate a laser beam; a first scanner having a first scanning surface, the first scanner configured to reflect the laser beam over a first angular range extending along a first direction; and a relay optic configured to receive the laser beam reflecting from the first scanner and reimage the laser beam over the first angular range from the first scanning surface onto a second scanning surface of a second scanner, the second scanner configured to reflect the laser beam over a second angular range extending along a second direction to generate a pattern of scan lines.

In another embodiment, a scanning laser device is provided, comprising: at least one source of laser light, the at least one source of laser light configured to generate a laser beam; a first scanner having a first scanning surface, the first scanner configured to reflect the laser beam over a first angular range extending along a first direction; a relay optic configured to receive the laser beam reflecting from the first scanner and reimage the laser beam over the first angular range from the first scanning surface onto a second scanning surface of a second scanner by generating an exit pupil for the first scanner on the second scanning surface such that the exit pupil for the first scanner is coincident with an exit pupil of the second scanner, the second scanner configured to reflect the laser beam over a second angular range extending along a second direction to generate a pattern of scan lines; and a drive circuit configured to provide an excitation signal to excite motion of the first scanner and the second scanner to reflect the laser beam in a pattern of scan lines.

In another embodiment, a scanning laser device is provided, comprising: at least one source of laser light, the at least one source of laser light configured to generate a laser beam; a first scanner having a first scanning surface, the first scanner configured to reflect the laser beam over a first angular range extending along a first direction; a relay optic configured to receive the laser beam reflecting from the first scanner and reimage the laser beam over the first angular range from the first scanning surface onto a second scanning surface of a second scanner such that first angular information contained in the laser beam at the first scanning surface is in an angle space when the laser beam strikes the second scanning surface of the second scanner; the second scanner configured to reflect the laser beam over a second angular range extending along a second direction such that the laser beam reflecting off the second scanner includes both the first angular information from the first scanner and second angular information from the second scanner to generate a pattern of scan lines; a waveguide configured to receive the pattern of scan lines from the second scanner; and a drive circuit configured to provide an excitation signal to excite motion of the first scanner and the second scanner to reflect the laser beam in a pattern of scan lines.

In the preceding detailed description, reference was made to the accompanying drawings that show, by way of illustration, specific embodiments in which the invention may be practiced. These embodiments were described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The preceding detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanning laser device, comprising:
   at least one source of laser light, the at least one source of laser light configured to generate a laser beam;
   a first scanner having a first scanning surface, the first scanner configured to reflect the laser beam over a first angular range extending along a first direction; and
   a relay optic configured to receive the laser beam reflecting from the first scanner and reimage the laser beam over the first angular range from the first scanning surface onto a second scanning surface of a second scanner by generating an exit pupil for the first scanner on the second scanning surface such that the exit pupil for the first scanner is coincident with an exit pupil of the second scanner, the second scanner configured to reflect the laser beam over a second angular range extending along a second direction to generate a pattern of scan lines.

2. The scanning laser device of claim 1, wherein the relay optic comprises an afocal relay.

3. The scanning laser device of claim 1, wherein the relay optic comprises a first imager and a second imager, the first imager configured to focus the first angular range of the reflected laser beam and the second imager configured to convert the focused laser beam over the first angular range into an afocal space.

4. The scanning laser device of claim 3, wherein the first imager is configured to form an image plane between the first imager and the second imager.

5. The scanning laser device of claim 1, wherein the relay optic comprises refractive elements.

6. The scanning laser device of claim 1, wherein the relay optic comprises reflective elements.

7. The scanning laser device of claim 1, wherein the relay optic comprises a plurality of four fold mirrors, the plurality of four hold mirrors configured to form an image plane between the plurality of four fold mirrors.

8. The scanning laser device of claim 1, further comprising an output optic, and wherein the output optic is configured to receive the pattern of scan lines from the second scanner.

9. The scanning laser device of claim 8, wherein the output optic comprises at least one of a waveguide, an exit pupil expander or a substrate guided relay.

10. The scanning laser device of claim 1, wherein the first scanner comprises a first scanning mirror and a first drive circuit configured to provide an excitation signal to excite motion of the first scanning mirror, and wherein the second scanner comprises a second scanning mirror and a second drive circuit configured to excite motion of the second scanning mirror.

11. A scanning laser device, comprising:
    at least one source of laser light, the at least one source of laser light configured to generate a laser beam;
    a first scanner having a first scanning surface, the first scanner configured to reflect the laser beam over a first angular range extending along a first direction;
    a relay optic configured to receive the laser beam reflecting from the first scanner and reimage the laser beam over the first angular range from the first scanning surface onto a second scanning surface of a second scanner by generating an exit pupil for the first scanner on the second scanning surface such that the exit pupil for the first scanner is coincident with an exit pupil of the second scanner, the second scanner configured to reflect the laser beam over a second angular range extending along a second direction to generate a pattern of scan lines; and
    a drive circuit configured to provide an excitation signal to excite motion of the first scanner and the second scanner to reflect the laser beam in a pattern of scan lines.

12. The scanning laser device of claim 11, wherein the relay optic comprises an afocal relay.

13. The scanning laser device of claim 11, wherein the relay optic comprises a first imager and a second imager, the first imager configured to focus the first angular range of the reflected laser beam and the second imager configured to convert the focused laser beam over the first angular range into an afocal space, and wherein the first imager is configured to form an image plane between the first imager and the second imager.

14. The scanning laser device of claim 11, wherein the relay optic comprises a plurality of four fold mirrors, the plurality of four hold mirrors configured to form an image plane between the plurality of four fold mirrors.

15. The scanning laser device of claim 11, wherein the scanning laser device is implemented in a heads up display (HUD).

16. The scanning laser device of claim 11, wherein the scanning laser device is implemented in a head mounted display (HMD).

17. The scanning laser device of claim 11, further comprising a waveguide, the waveguide configured to receive the pattern of scan lines from the second scanner.

18. The scanning laser device of claim 11, further comprising a substrate guided relay, the substrate guided relay configured to receive the pattern of scan lines from the second scanner.

19. A scanning laser device, comprising:
- at least one source of laser light, the at least one source of laser light configured to generate a laser beam;
- a first scanner having a first scanning surface, the first scanner configured to reflect the laser beam over a first angular range extending along a first direction;
- a relay optic configured to receive the laser beam reflecting from the first scanner and reimage the laser beam over the first angular range from the first scanning surface onto a second scanning surface of a second scanner such that first angular information contained in the laser beam at the first scanning surface is in an angle space when the laser beam strikes the second scanning surface of the second scanner; the second scanner configured to reflect the laser beam over a second angular range extending along a second direction such that the laser beam reflecting off the second scanner includes both the first angular information from the first scanner and second angular information from the second scanner to generate a pattern of scan lines;
- a waveguide configured to receive the pattern of scan lines from the second scanner; and
- a drive circuit configured to provide an excitation signal to excite motion of the first scanner and the second scanner to reflect the laser beam in a pattern of scan lines.

* * * * *